United States Patent [19]

Matsubara et al.

[11] Patent Number: 5,360,277
[45] Date of Patent: Nov. 1, 1994

[54] LABEL PRINTER WITH SELECTIVE MEMORY UPDATE

[75] Inventors: Motoki Matsubara, Takaishi; Kenichi Fujii, Osaka; Kazuya Bessho, Amagasaki, all of Japan

[73] Assignee: New Oji Paper Co., Ltd., Tokyo, Japan

[21] Appl. No.: 827,769

[22] Filed: Jan. 29, 1992

[30] Foreign Application Priority Data

Jan. 29, 1991 [JP] Japan ................................. 3-102137

[51] Int. Cl.⁵ .......................................... B41J 5/30
[52] U.S. Cl. ........................................ 400/68; 400/63
[58] Field of Search ....................... 400/61, 68, 76, 63, 400/121

[56] References Cited

U.S. PATENT DOCUMENTS

| | | | |
|---|---|---|---|
| 4,677,551 | 6/1987 | Suganuma | 400/76 |
| 4,826,333 | 5/1989 | Tanaka | 400/68 |
| 4,944,614 | 7/1990 | Tanaka | 400/68 |
| 4,988,221 | 1/1991 | Shibayama | 400/61 |
| 5,104,245 | 4/1992 | Oguri | 400/76 |
| 5,156,468 | 10/1992 | Uematsu | 400/68 |

FOREIGN PATENT DOCUMENTS

255964 10/1990 Japan ................................. 400/121

*Primary Examiner*—David A. Wiecking
*Assistant Examiner*—Steven S. Kelley
*Attorney, Agent, or Firm*—Wenderoth, Lind & Ponack

[57] ABSTRACT

A dot printer receives coded printing information, and expands it into dots in an image memory. When expanding the information into dots, the printing contents of the previous printed document and the new printing document are compared as to their coded information. Only the changed portions therebetween are rewritten in the image memory. As a result, the printing efficiency with respect to multiple documents of the same type in which only small portions thereof change is improved.

3 Claims, 7 Drawing Sheets

LABEL PRINTER WITH SELECTIVE MEMORY UPDATE

BACKGROUND OF THE INVENTION

1. Field of the Invention

The present invention relates to a dot printer.

2. Description of the Prior Art

In a dot printer, printing information for one page is expanded in dots on an image memory, and dot data is sequentially sent to a printing head to be printed. Usually, the data processing time for expanding one-page printing information in dots, and the time required for printing one page are nearly equal. To enhance the efficiency of the printer, using two image memories, a method of expanding the printing information of the next page in dots while simultaneously printing a first page has been proposed. Its shortcoming is, however, that two image memories are required. In particular, in the case of bills and labels affixed to the articles, the to distinguish articles document format or the various contents of different bills or labels are mostly the same, and are different only in part. When printing such printing information sequentially, almost the same printing patterns are repeatedly expanded on the dots in two images memories every time, which is very uneconomical.

In the continuous printing of multiple documents of the same type which differ only in part, a system that divides the printing information into a fixed portion and a variable portion has been proposed. In this system, the fixed portion and the variable portion are respectively expanded in the separate image memories, and the content of the image memory of the fixed portion is kept unchanged. By sequentially rewriting only the image memory of the variable portion, an OR operation between the contents of both image memories is effected and outputted to the printing head.

In such a system, for manually handling the printing content, it is convenient to treat the variable portion as a variable column in a document. Even in the variable column, however, the content of the column is not changed entirely in every document. For example, the date is variable, but the same date may be used over several pieces of a certain document. Even if the date varies in every document, only one digit of the date is changed in many cases. In such cases, it is a waste of time to rewrite the whole column every time. Besides, two image memories requiring a large memory capacity are needed.

SUMMARY OF THE INVENTION

It is hence a primary object of the invention to present a dot printer capable of improving the printing efficiency without preparing two page memories, when sequentially printing documents which are almost the same but only partly different in their printing pattern every time.

To achieve the above object, a printer in accordance with the present invention expands coded printing information for every page into dot image data on an image memory and outputs the content of the image memory in sequence to a printing head, wherein the improvement comprises, a control means for comparing coded data of printing information to be newly printed with the coded data of printing information for the previous page, and for rewriting said expanded image data of the previous page only for those portions of the coded data which have been changed.

Also in the present invention, the printer further comprises a buffer memory, into which said coded data of printing information is to be stored.

In the present invention, the buffer memory is cleared when a first page is printed.

The printer also comprises a memory, into which one page of said printing information to be newly printed is stored.

The printer further comprises a memory, into which a plurality of pages of said printing information to be newly printed is stored.

The printer moreover comprises a memory, into which said coded data of printing information for the previous page and said coded data of printing information to be newly printed are separately stored.

The printer moreover comprises a memory for storing the storage location in the memory of a previous page instead of a buffer memory for storing the coded data of printing information of the previous page if the printer has a memory for storing data for plural pages.

The printer also comprises a means for comparing both of said coded data during the print process for the previous page.

The printing head may be a thermal head.

The printer receives the coded printing information and expands it into dots. This dot printer is provided with a control means. The control means compares the previously printed coded printing data and the coded printing data to be newly printed, and rewrites only the portions which are different in the image memory.

Generally, the portion of the dot pattern data to be changed in the image memory is only slight. It is therefore a waste of time to enter the whole contents of the image memory again only for rewriting the changed portion. To rewrite only the changed portion, a comparison of the previous page with the new page in a dot expanded state takes a longer processing time than a dot expansion of the whole page.

In the present invention, since the printing information is compared in the coded form between the previous page and the new page, the processing time is much shorter than comparison in a dot expanded state. Besides, since only the changed portion in the image memory is rewritten, the time required to expand one page into dots is greatly shortened. Although the time required for the comparison of the printing information between the previous page and new page is added, the total printing time is notably curtailed.

Thus, according to the present invention, since only the changed portion of the contents of the image memory is rewritten, the dot expanding processing time for printing the information of one page is significantly shortened. In particular, if the variable portion in a document is e.g.—a date or the serial number of documents, only a part actually changes in every page in a variable column. In such a case, in the present invention, the entire variable column is not written, but only the truly changed portion is rewritten, so that the curtailing effect of the dot expanding processing time is much greater.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
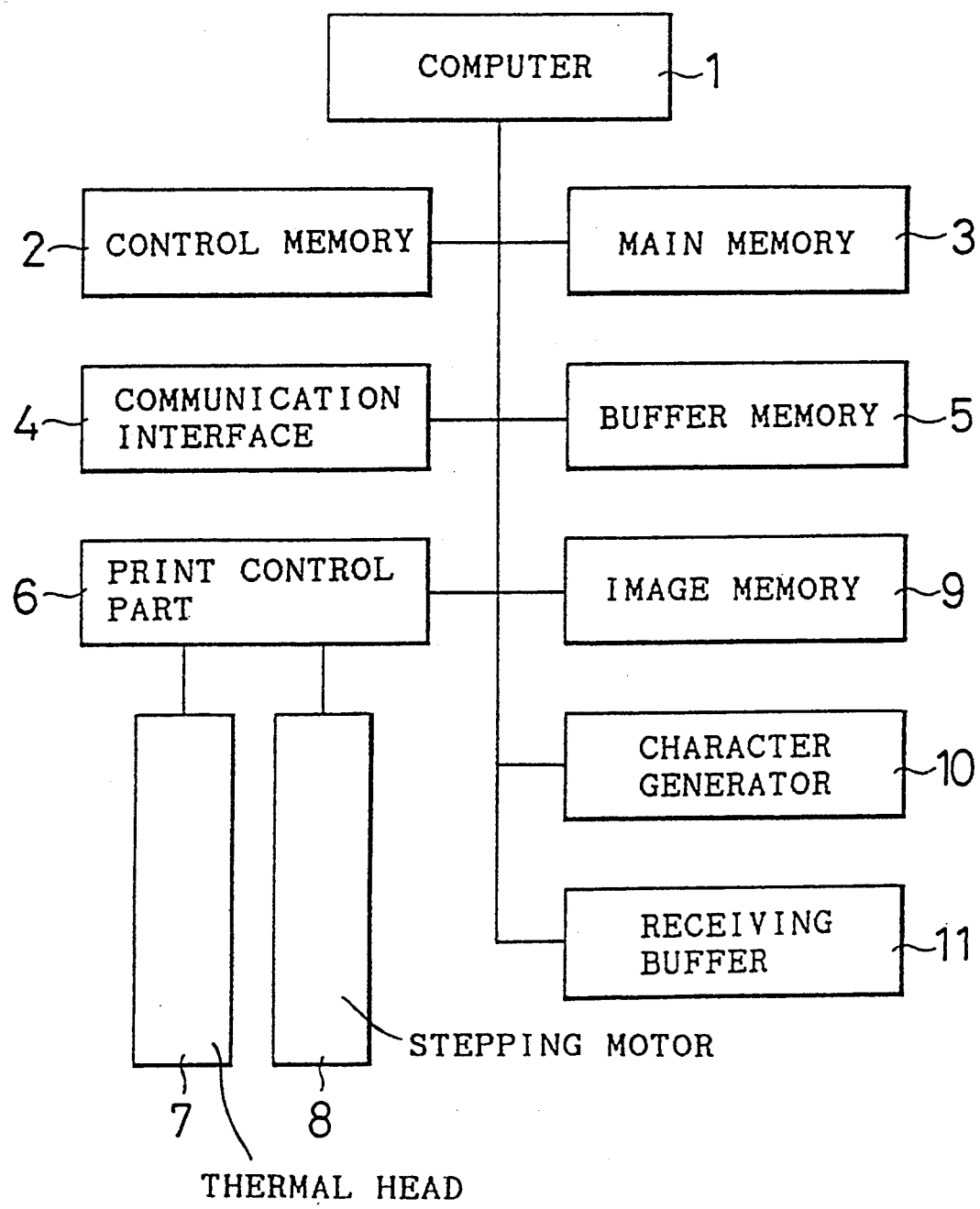
FIG. 1 is a block diagram of a printer in accordance an embodiment of the present invention.

Now referring to the drawing, preferred embodiments of the invention are described below.

FIG. 1 shows a block diagram of a printer in accordance with an embodiment of the present invention. In this diagram, a computer 1 is realized by a microcomputer or the like and controls the entire printer. A control memory 2 stores the control program for operating the computer 1. A main memory 3 stores the printing information in coded form. A communication interface 4 receives the data sent from the outside and the data are stored in a receiving buffer 11. In the received data, printing information is stored in the main memory 3. A buffer memory 5 stores the printing information for the previous page which is read out of the main memory 3 and printed. A print control part 6 drives and controls a thermal line head 7, and a stepping motor 8 for line feed, and other elements, under the control of the computer 1. In an image memory 9, image data for one page is stored, and the data is provided to the print control part 6. A character generator 10 stores the printing information for dot expansion, corresponding to the printing information in coded form.

Figure 2:
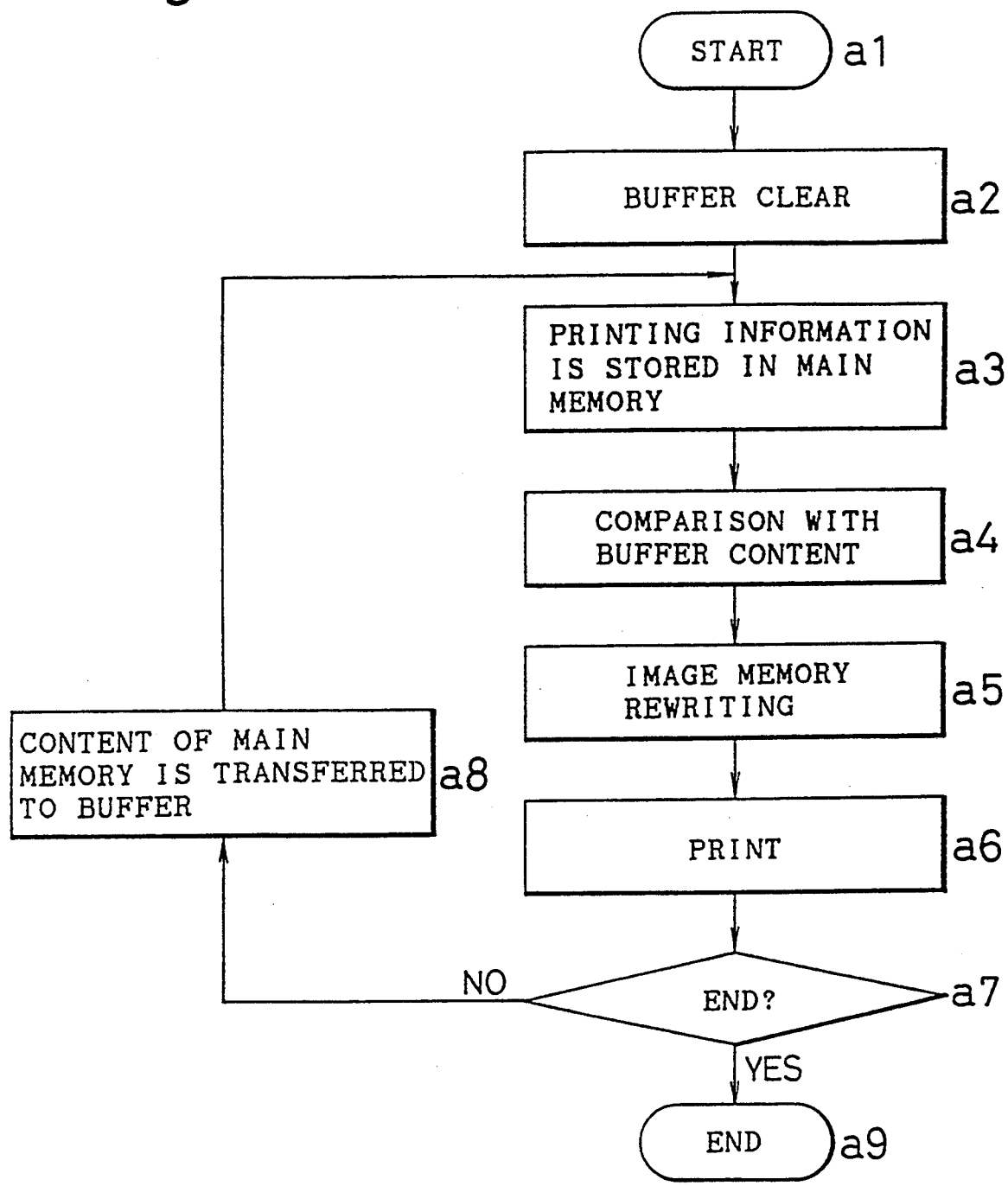
FIG. 2 is a flowchart showing an operation of the printer shown in FIG. 1.
Figure 6A:
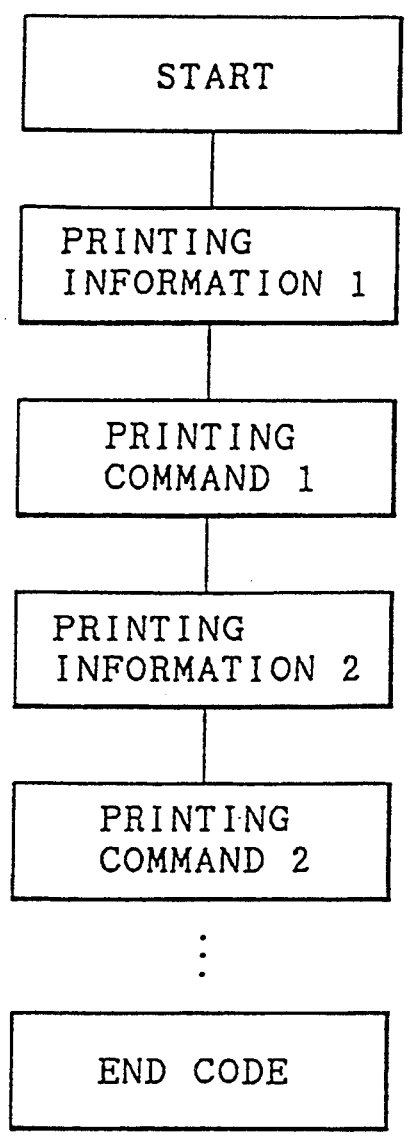
FIGS. 6 (a) and 6 (b) are diagrams showing code information structure of received data.
Figure 6B:
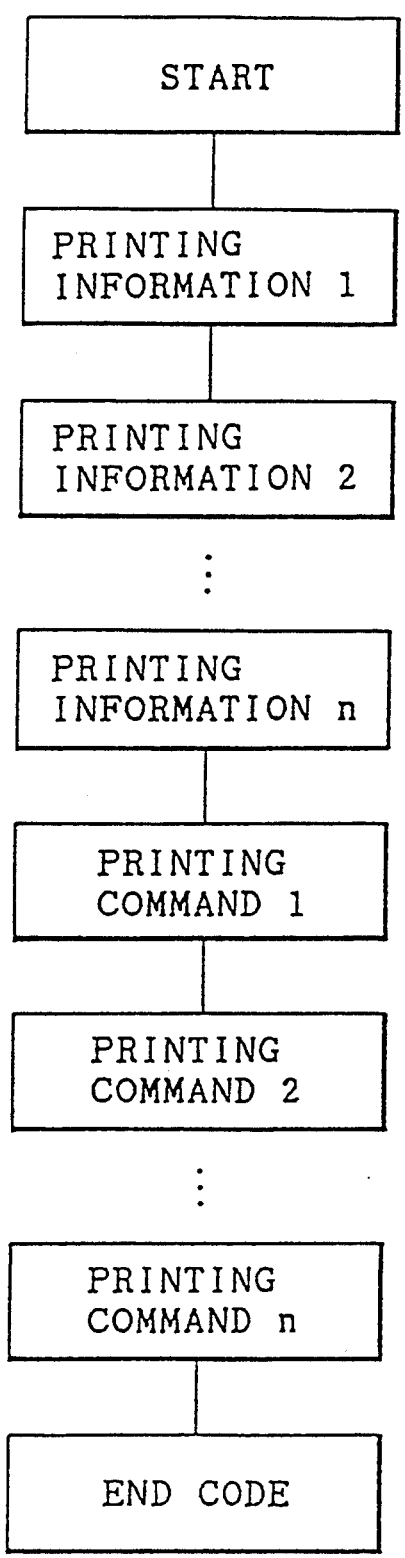

FIG. 2 is a flowchart of a printing operation of the above-described printer. At first, the data which is transmitted from the host computer or the like, for example the printing information, or the printing command is received at the communication interface 4, and the operation is started from step a1 at the same time. The receiving data is coded information in the form as shown in FIG. 6 (a) and stored in the receiving buffer 11. The receiving operation is carried out as an interruption process. At step a2, the buffer memory 5 is cleared.

At step a3, in succession, the data is read out from the receiving buffer 11 and only the printing information is stored in the main memory 3. If the data which is read out from a buffer memory 11 is a printing command, the operation proceeds to step a4. At step a4, the content of the main memory is read out, and then it is compared with the content of the buffer memory 5. At step a5, as a result of the comparison between the content of the main memory 3 and the content of the buffer memory 5, only the difference therebetween, i.e. the changed portion, is rewritten in the image memory 9. In the first page, since the buffer memory 5 remains cleared, the result of the comparison at step a4 is that the entire printing information is changed. Therefore, at step a5, the printing information of the whole first page is expanded into dots and stored as image data in the image memory 9. At this time, the dot expansion of printing information is executed by the computer 1 while referring to the character generator 10.

At step a6, consequently, the content of the image memory 9 is read out by the print control part 6, and outputted into the thermal line head 7 to be printed out. At step a7, a determination is made as to whether or not printing of the entire sentence is over. In the embodiment shown in FIG. 1, an end message is sent from the host computer or the like, so that a determination is made as to whether or not is finished by reading out from the receiving buffer 11 and judging it. If it has not finished yet, going to step a8, the content of the main memory 3 is transferred into the buffer memory 5. Afterwards, furthermore, the operation after step a3 is repeated. When the end of printing is judged at step a7, the operation is terminated at step a9.

In the printing of the second and subsequent pages, the printing information of the previous page is stored in the buffer memory 5 at step a8. At step a4, therefore, only the changed portion of the printing information between the previous page and the present page is picked up. At step a5, only the changed portion of dot pattern in the image memory 9 is corrected, and printed at step a6.

Figure 7A:
FIGS. 7 (a), 7 (b) and 7 (c) are memory maps of the stored content of the main memory and the buffer memory.
Figure 7B:
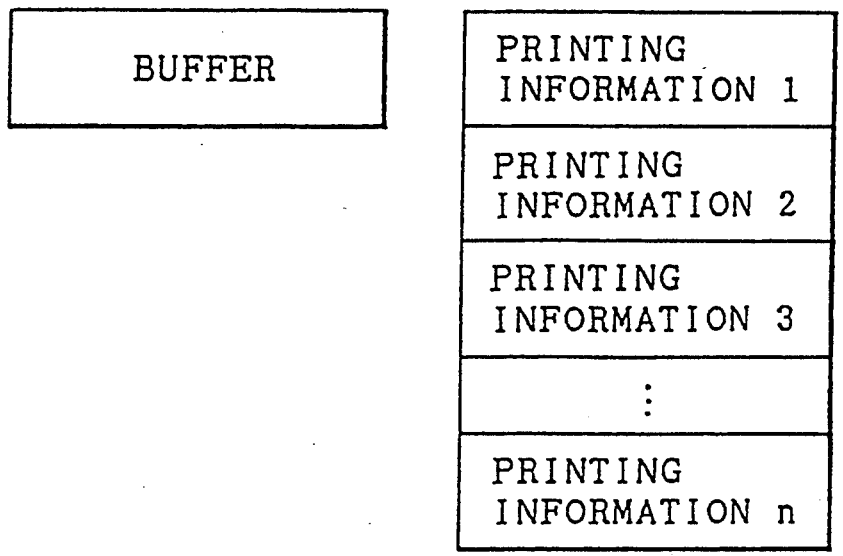
Figure 7C:
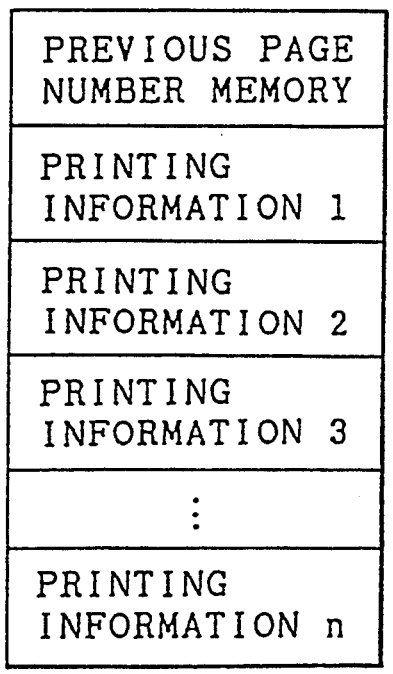

In this embodiment, upon printing of every page as shown in FIG. 7 (a), the printing information of next page is received, but it is also a possible to receive a series of the entire printing information in the main memory 3 as shown in FIG. 7 (b). By storing the previous page number as shown in FIG. 7 (c) and reading out the coded information of the previous page number and the coded information of present printing page from the main memory 3 and comparing the printing information, the buffer memory 5 is rendered unnecessary.

Figure 3:
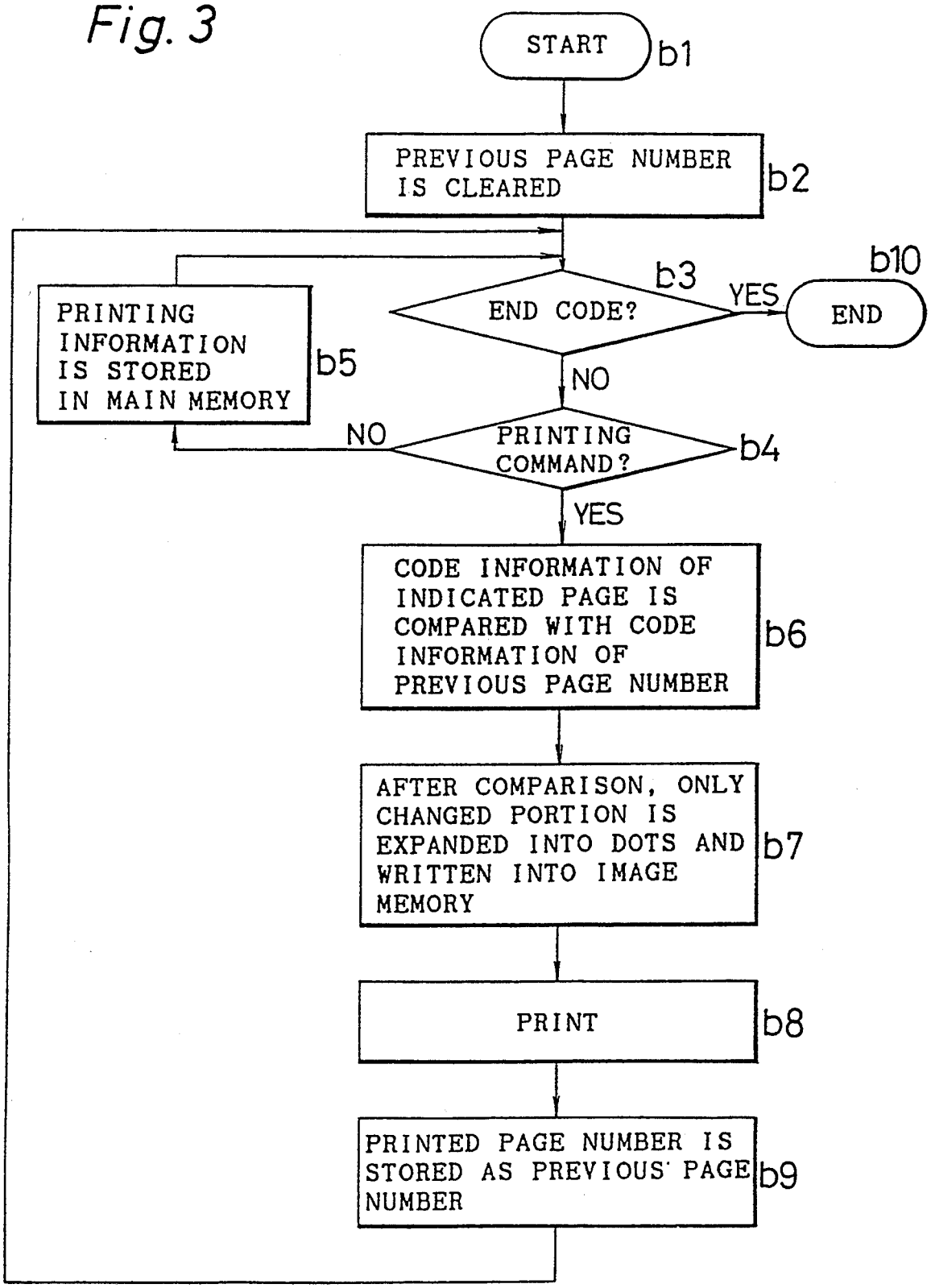
FIG. 3 is a flowchart showing an operation of a printer in accordance another embodiment of the present invention.

FIG. 3 shows the operation for storing a series of entire printing information in the main memory 3. At first, the data which is transmitted from the host computer or the like, for example the printing information, a the printing command, is received at the communication interface 4, and the operation is started from step b1 at the same time. The received data is coded information in the form as shown in FIG. 6 (b) and is stored in the receiving buffer 11. The receiving operation is carried out as an interruption process. At step b2, the previous page number is cleared. At step b3, the data is read out from the receiving buffer 11, and a determination is made as to whether or not it is an end code. If the data is not the end code, a determination is made as to whether or not the data is a printing command at step b4. If the data is judged not to be the printing command, the operation proceeds to step b5, and the data is judged to be printing information and is stored in the main memory 3 for every page number. Thereafter, the operation returns to step b3.

When judged to be a printing command at step b4, the operation goes to step b6. At step b6, the code information of the indicated page by the printing command and the code information of the previous page number are compared. Consequently, at step b7, only the portion which is judged to be changed by the comparison is expanded into dots, and written into the image memory 9. Regarding the first page, since the previous page number is cleared at step b2, the printing information for the entire page is expanded into dots, and written into the image memory 9. The data written in the image memory is printed at step b8. At step b9, the printed page number is stored as the previous page, and the operation returns to step b3. The operation from step b3 to step b9 is repeated until an end code is detected. At step b3, when the next stored data read out of the main memory 3 is judged to be an end code, the operation goes to step b10 and is terminated.

Figure 4:
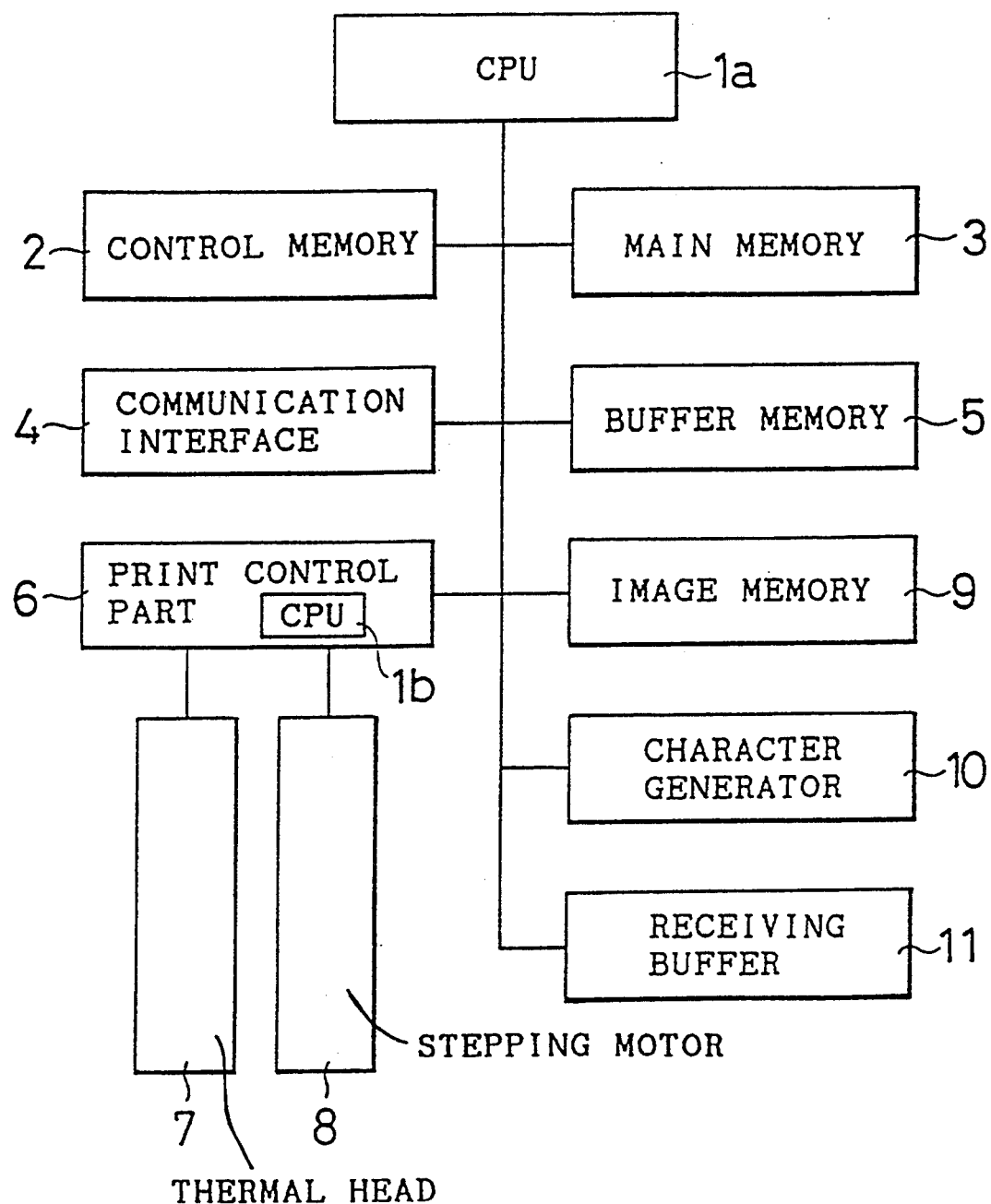
FIG. 4 is a block diagram of a printer in accordance with still another embodiment of the present invention.

The comparison of coded data for the previous page printing portion and the new printing page may be executed in parallel with the printing of the information for the previous page. In this case, as shown in FIG. 4, two central processing units (CPUs) 1a and 1b are used, for the processing of the comparison and the printing, respectively. Or, using a high performance CPU like that of 32 bits, multitask processing may be realized.

To compare the printing information between the previous page and the new printing page, the data of each page may be provided with format numbers to distinguish the pages.

Figure 5:
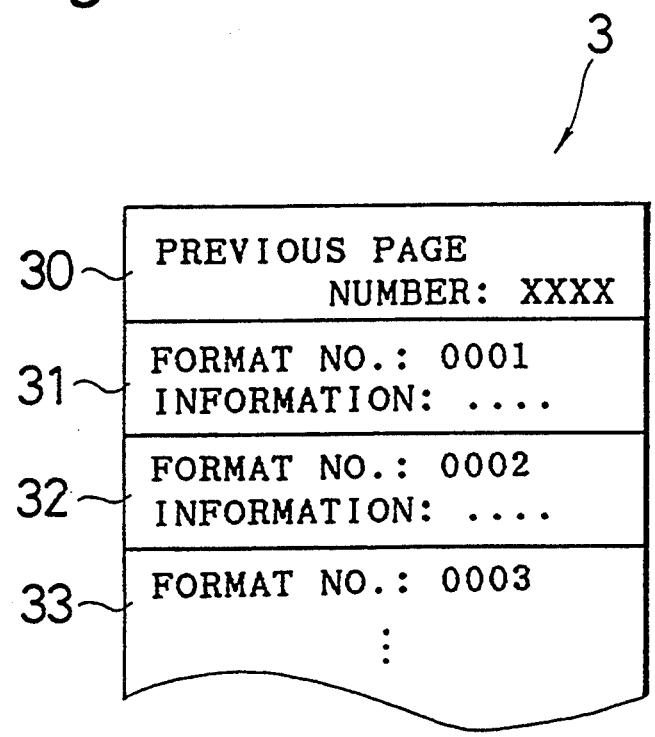
FIG. 5 is a memory map showing the stored content of the main memory of a printer in accordance with still another embodiment of the present invention.

FIG. 5 shows a memory map in the main memory 3 for distinguishing the pages by format numbers. In a memory region 30, the previous page number is stored. In a memory region 31, the information corresponding to the format number 0001 is stored. In a memory region 32, the information corresponding to the format number 0002 is stored. In a memory region 33, the information corresponding to the format number 0003 is stored. Thereafter, the information corresponding to the format numbers is sequentially stored. To distinguish the information of each page, instead of the format numbers, flags may be also used.

The invention may be embodied in other specific forms without departing from the spirit or essential characteristics thereof. The present embodiments are therefore to be considered in all respects as being illustrative and not restrictive, the scope of the invention being indicated by the appended claims rather than by the foregoing description and all changes which come within the meaning and the range of equivalency of the claims are therefore intended to be embraced therein.

What is claimed is:

1. In a printer which expands coded printing information for every page into dot image data which is then stored in an image memory and then outputs the stored contents of the image memory in sequence to a printing head, the improvement comprising:

a main memory for storing printing information of at least one page to be printed in coded form;

a buffer memory for storing printing information in coded form of a previous page which had been read out of said main memory and printed;

a control means for comparing said stored printing information of one page stored in said main memory with printing information of said previous page stored in said buffer memory and determining which portions of the printing information in coded form has been changed and then revising the expanded image data of said previous page stored in the image memory by sending only information corresponding to those changed portions of the printing information in coded form.

2. A printer as in claim 1, further comprising a memory for storing the printing information to be newly printed for a plurality of pages.

3. A printer as in claim 2, further comprising a memory for storing a location in the memory of a previous page instead of a buffer memory for storing the printing information of the previous page.

* * * * *